United States Patent [19]

Kallin

[11] 4,442,769
[45] Apr. 17, 1984

[54] STAGING APPARATUS USED IN A SHEET FEEDING ENVIRONMENT

[75] Inventor: Fredrik L. N. Kallin, Kitchener, Canada

[73] Assignee: NCR Corporation, Dayton, Ohio

[21] Appl. No.: 334,399

[22] Filed: Dec. 24, 1981

[51] Int. Cl.³ .................................... G06K 13/077
[52] U.S. Cl. .................. 101/93.19; 101/242; 271/246; 400/630
[58] Field of Search ............. 271/246, 245, 272-274; 101/93.19, 232, 242, 241, 239; 400/630

[56] References Cited

U.S. PATENT DOCUMENTS

| | | | |
|---|---|---|---|
| 3,039,592 | 6/1962 | Fliegner et al. | 198/34 |
| 3,532,338 | 10/1970 | Brinson et al. | 271/53 |
| 3,637,203 | 1/1972 | French | 271/246 |
| 3,844,552 | 10/1974 | Bleau et al. | 271/246 X |
| 3,888,478 | 6/1975 | Alderman, Jr. et al. | 271/245 X |
| 4,030,723 | 6/1977 | Irvine et al. | 271/11 |
| 4,074,902 | 2/1978 | Bradbury | 271/34 |
| 4,079,669 | 3/1978 | Nyborg | 101/37 |
| 4,152,584 | 5/1979 | Sato | 235/475 |

FOREIGN PATENT DOCUMENTS 47-6996 of 1972 Japan ........................ 271/246

OTHER PUBLICATIONS

Abbott, et al., "Multifunction Gate Mechanism", *IBM Technical Disclosure Bulletin*, vol. 32, No. 10, pp. 4387-4389, Mar. 1980.
Baumberger et al., "Articulated Roll and Document Gate Mechanism", *IBM Technical Disclosure Bulletin*, vol. 18, No. 10, Mar. 1976, pp. 3199.
Amundson et al., "Wait Station Brake for Document Cards", *IBM Technical Disclosure Bulletin*, vol. 12, No. 7, Dec. 1969, p. 1112.
Johnson et al., "Document Transport System", *IBM Technical Disclosure Bulletin*, vol. 13, No. 6, Nov. 1970, pp. 1468, 1469.

*Primary Examiner*—Clifford D. Crowder
*Attorney, Agent, or Firm*—J. T. Cavender; Albert L. Sessler, Jr.; Elmer Wargo

[57] ABSTRACT

A sheet feeding apparatus having a track for guiding a sheet therein, with the track having an upstream end and a downstream end, and with a staging area located therebetween. Transport rollers are used for moving a sheet from the upstream end towards the downstream end. The apparatus also comprises control means including a stationary member and a moveable member located at the staging area; the moveable member is moveable between first and second positions with regard to said stationary member and one of the transport rollers. The moveable member, when in the first position, is operatively uncoupled from a transport roller and is operatively coupled to said stationary member to stop a sheet therebetween at the staging area, and the moveable member, when in the second position, is operatively uncoupled from the stationary member and is operatively coupled to one of the transport rollers to move the sheet from the staging area towards the downstream end. The control means also includes actuators for moving the moveable member between the first and second positions.

4 Claims, 11 Drawing Figures

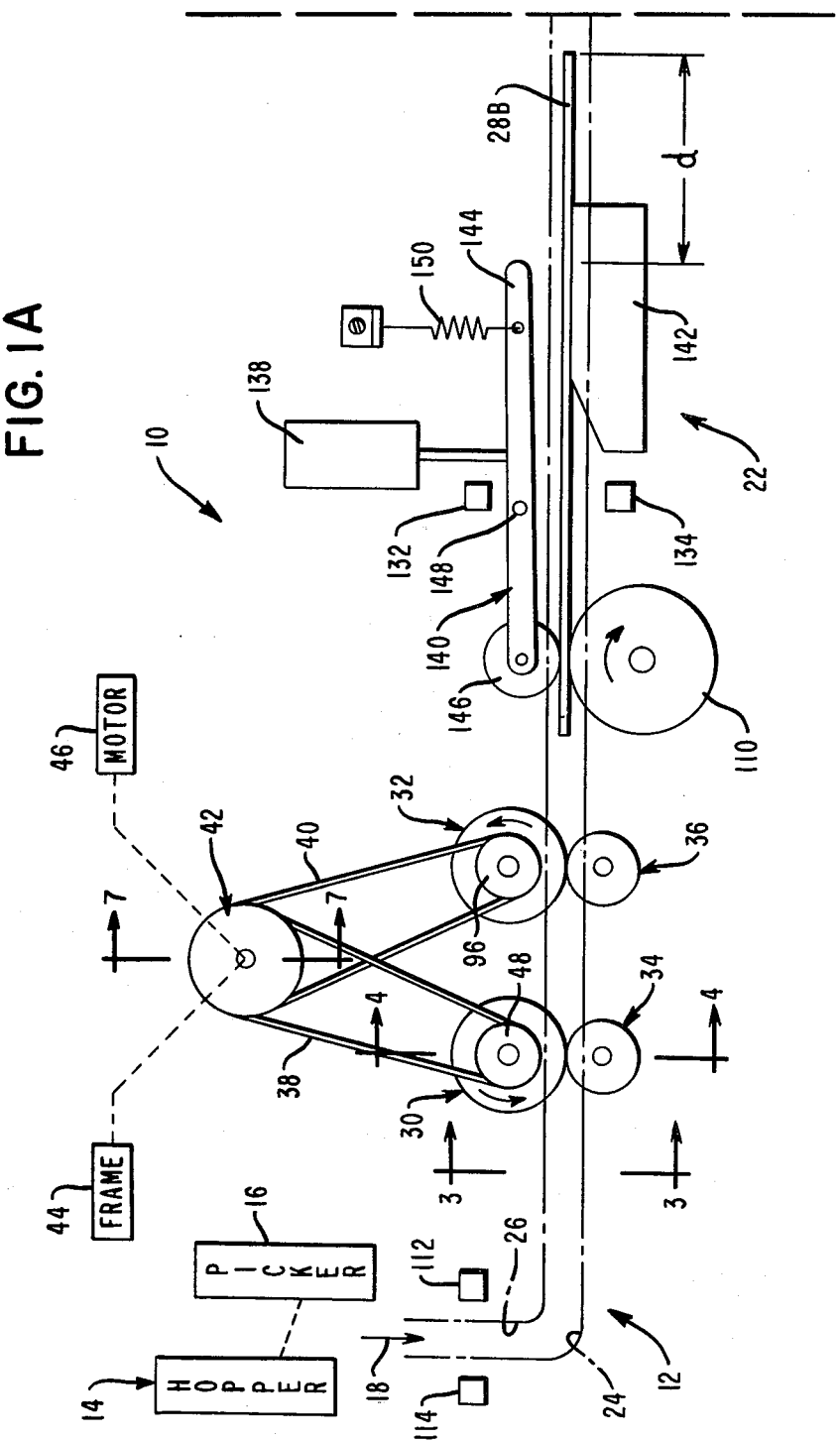

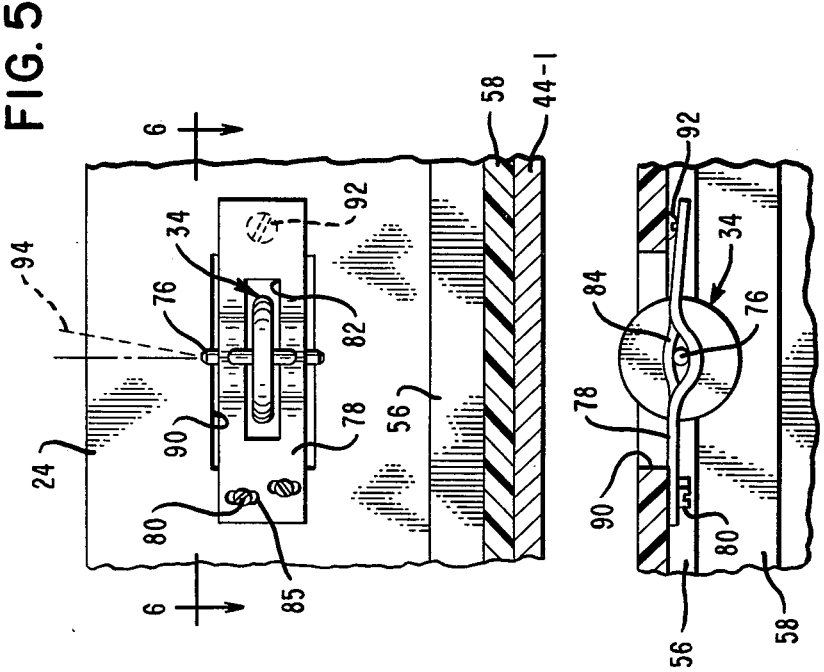
FIG. 5
FIG. 6
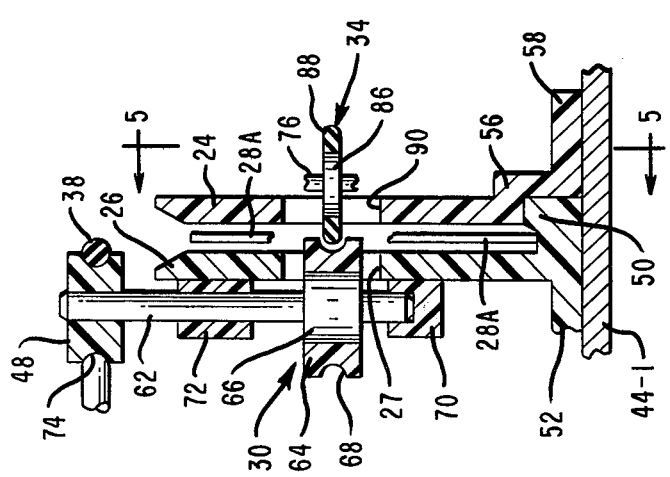
FIG. 4

STAGING APPARATUS USED IN A SHEET FEEDING ENVIRONMENT

BACKGROUND OF THE INVENTION

This invention relates generally to a staging apparatus which is used in a sheet-feeding environment and in particular, it relates to a pinch toggle mechanism in the staging apparatus which increases the throughput of sheets through the environment.

In certain sheet-feeding environments such as encoding terminals, for example, the associated sheets or documents such as checks, deposit slips, and the like are fed from a hopper to a track where transport means associated with the track are used to move the documents to an encoder or printing device which prints or encodes certain data on the documents. Between the hopper and the encoder, there is located a staging area at which the documents are momentarily stopped in preparation for feeding them to the encoder in the example being described. One document is held in a "ready" state at the staging area while the preceding document at the encoder is printed upon. When the printing is completed at the encoder, the document located thereat is moved out of the encoder to enable the encoder to accept the document held in the "ready" position at the staging area. The document at the staging area is then moved by the transport means to the encoder to repeat the process.

In prior-art, sheet-feeding environments which employed a staging area, the mechanism which stopped the document thereat generally included a finger-type blade which was moved into the track in the path of an oncoming document to stop it by having its leading edge abut thereagainst. The transport means associated with the track generally included what is termed a low-friction or a "soft drive" which included a driving roller and an associated pinch roller which continued to rotate and "slip" somewhat while the document was stopped at the staging area by the blade mentioned. When the document at the staging area was to be released, it was necessary to withdraw the blade out of the track. Because of the "soft drive" effected by the drive roller and its associated pinch roller, they were slower in their ability to bring the document up to normal track speed from the "at rest" position at the staging area when compared to high friction rollers. Naturally, high friction rollers might tend to damage a document held stationary at the staging area by the blade mentioned due to their "scrubbing" action.

SUMMARY OF THE INVENTION

In a preferred embodiment of this invention there is shown a sheet feeding apparatus comprising means for guiding a sheet therein; the guiding means having an upstream end and a downstream end, with a staging area located therebetween; means for moving a sheet from the upstream end towards the downstream end; and control means including a stationary member and a moveable member located at the staging area; the moveable member being moveable between first and second positions with regard to the stationary member and the moving means; the moveable member when in the first position being operatively uncoupled from the moving means and being operatively coupled to the stationary member to stop a sheet therebetween at the staging area, and the moveable member when in the second position being operatively uncoupled from the stationary member and being operatively coupled to the moving means to move the sheet from the staging area towards the downstream end; and the control means also including means for moving the moveable member between the first and second positions.

An advantage of this invention is that the point at which a sheet may be stopped at the staging area within the guiding means can be varied in accordance with the length of a prior sheet fed through the guiding means so as to maximize the throughput of sheets passing through the apparatus.

Other advantages are that the apparatus is low in cost to produce and that it can be used with a variety of utilization apparatuses which require a staging area for sheets to wait prior to being fed thereto.

These advantages and others will be more readily understood in connection with the following specification, claims and drawing.

BRIEF DESCRIPTION OF THE DRAWING

FIGS. 1A and 1B taken together represent a plan view, in schematic form, showing the apparatus of this invention;

FIG. 4 is a cross-sectional view, taken along the line 4—4 of FIG. 1A to show additional details of the means for moving the sheets in the guiding means;

FIG. 5 is a side view in elevation taken along the line 5—5 of FIG. 4 to show additional details of a part of the means for moving the sheets in the guiding means;

FIG. 6 is a cross-sectional view, taken along the line 6—6 of FIG. 5 to show additional details of a pinch roller shown in FIG. 5;

DETAILED DESCRIPTION OF THE INVENTION

Figure 1B:
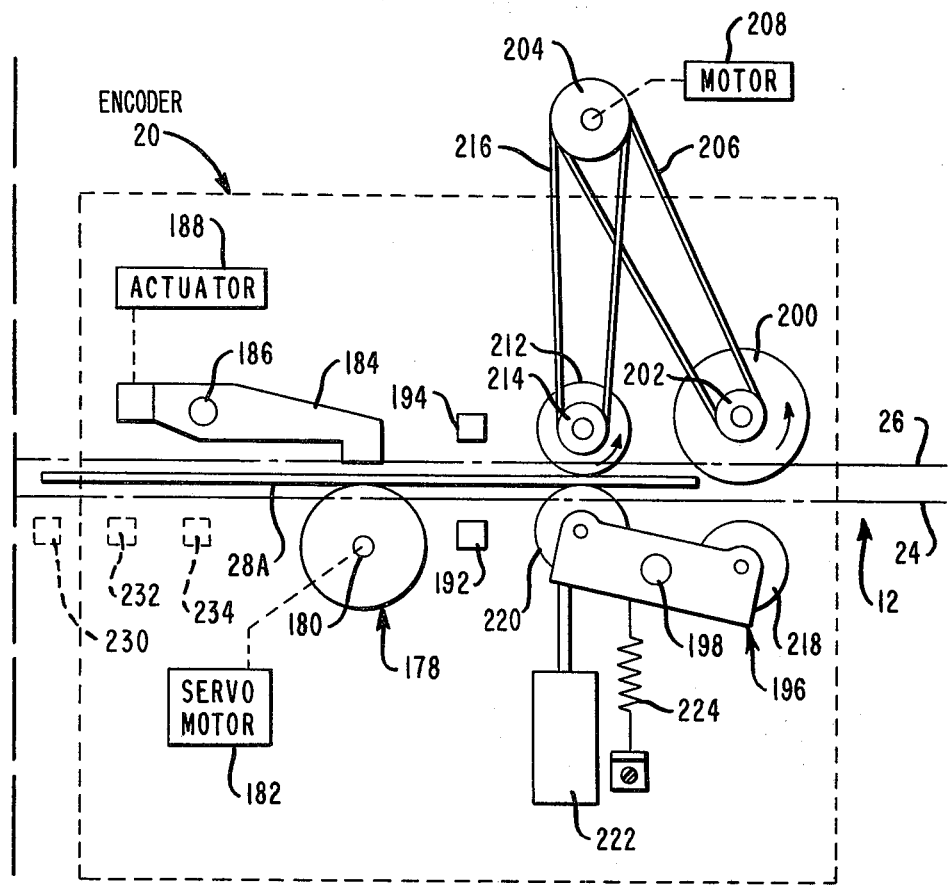

FIGS. 1A and 1B, taken together, represent a schematic diagram of the apparatus of this invention which is designated generally as 10, showing its use in a typical environment. Certain of the elements shown in FIGS. 1A and 1B are distorted in size and are shown diagrammatically so as to facilitate an understanding of the invention.

As earlier stated herein, the apparatus 10 may be used in sheet-feeding environments. The sheets or documents which are fed by the apparatus 10 may include, for example, checks, deposit slips, lottery tickets and the like. The apparatus 10 is especially useful in environments which require a staging area to where documents or sheets are fed and momentarily stopped and held in a "ready" position until they are needed at a utilization device which is located downstream from the staging area.

The apparatus 10 (FIGS. 1A and 1B) has a means for guiding the sheets therethrough, and this includes a track designated generally as 12. The track 12 has an upstream end at which the hopper 14 is located; the hopper 14 is used to store sheets in a stack to be dispensed therefrom. As viewed from FIG. 1A, the sheets are stored in the hopper 14 on edge with top long edge of the sheets being aligned with arrow 18. A conventional picker 16 is used to pick a sheet from the hopper 14 and transfer it in the direction of arrow 18 to the track 12. The track 12 has a downstream end at which a utilization device such as a printer or encoder shown in dashed outline 20 (FIG. 1B) is located, and the track 12 also has a staging area 22 which is located between the upstream and downstream ends of the track 12.

The track 12 is shown schematically in FIGS. 1A and 1B and includes spaced side walls 24 and 26 which are shown as dashed lines. The walls 24 and 26 are positioned vertically in the embodiment described, and a sheet like sheet 28A is positioned at the encoder 20 on its lower edge with the length and top edge of the sheet 28A showing in FIG. 1B. A next successive sheet 28B is positioned at the staging area 22. Details of the track 12 which guides the sheets 28A and 28B will be described hereinafter.

The apparatus 10 also includes means for moving a sheet like 28A along the track 12; this means is represented by drive rollers 30 and 32 and their respective pinch rollers 34 and 36. The rollers 30 and 32 are spaced along the track 12 at intervals therealong which enable a sheet 28A of the shortest length expected to be transferred thereby. The side walls 24 and 26 of the track 12 have suitable apertures (not shown in FIGS. 1A and 1B) to enable a drive roller like 30 and its associated pinch roller like 34 to transport a sheet therebetween while keeping it approximately in the center of the track 12. The drive rollers 30 and 32, for example, are rotated in a counterclockwise direction (as viewed in FIG. 1A) by endless belts 38 and 40 which are rotated by a multi or tandem pulley 42 which is rotatably mounted in a frame 44 of the apparatus 10, and is driven by a motor 46. The endless belt 38 is operatively coupled to a drive pulley 48 which rotates the associated drive roller 30 as better shown in FIG. 4.

Figure 3:
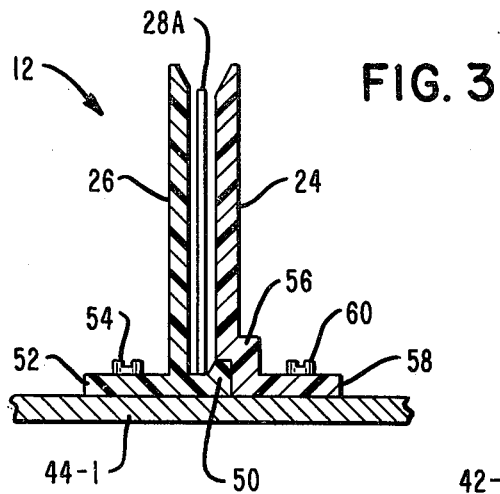
FIG. 3 is a cross-sectional view, taken along line 3-3 of FIG. 1A to show additional details of the means for guiding the sheets through the apparatus.

The construction of the track 12 is best shown in FIG. 3. The side wall 26 has a trough portion 50 which is integrally formed therewith to form the bottom of the track 12. The side wall 26 also has a flange portion 52 extending therefrom to enable the sidewall 26 to be secured to a mounting plate 44-1 (which is part of the frame 44 shown only schematically in FIG. 1A) by fasteners like 54.

The side wall 24 of the track 12 has the general cross-sectional shape shown in FIG. 3; it has an angled or offset portion 56 to accommodate the trough portion 50 of the side wall 26. The side wall 24 also has a flange portion 58 to enable it to be secured to the mounting plate 44-1. In the embodiment described, the track 12 is oriented in a vertical plane to enable a sheet like 28A guided thereby to have its long lower edge glide over the trough portion 50. The track 12 may be made of a plurality of sections (of plastic material, for example) having the cross-sectional shape described in relation to FIG. 3 to provide the necessary length of the track 12 for a particular application.

The means for moving a sheet like 28A through the track is best shown in FIG. 4 which is a cross-sectional view taken along the line 4—4 of FIG. 1A. The drive roller 30 has a shaft portion 62 having the drive pulley 48 secured to one end thereof and a wheel or tire 64 formed around an enlarged portion 66 of the shaft 62. The tire 64 is preferably made of plastic material and has an annular recess 68 formed around the perimeter thereof. The shaft 62 is rotatably supported in conventional bearing mounts 70 and 72 which are detachably secured to the side wall 26. The drive roller 30 is located on the side wall 26 so that its periphery extends through a recess 27 in side wall 26 to about midway into the track space between the side walls 24 and 26. The drive pulley 48 has an annular recess 74 formed around the perimeter thereof to receive the endless belt 38 which is circular in cross-section and which is drivingly retained in the recess 74.

The pinch roller 34 shown only schematically in FIG. 1A is shown in more detail in FIGS. 4, 5 and 6. The roller 34 has an axle 76 which is rotatably supported, in a plate 78 which is adjustably secured to the side wall 24 by fasteners 80. The plate 78 has an opening 82 therein to enable the roller 34 to be mounted therein. The roller 34 may be mounted in the plate 78 by having certain flange portions like 84 (FIG. 6) formed from the plate 78 itself, thereby forming the supports for the axle 76 as is conventionally done. The plate 78 also has slots 85 therein to enable the plate 78 and the pinch roller 34 to be adjustably positioned with respect to the drive roller 30, and thereafter fasteners 80 are secured to hold the pinch roller 34 in the position shown best in FIG. 4. The plate 78 is not shown in FIG. 4 to simplify the drawing. The axle 76 has an enlarged cylindrical portion 86 around which is formed a sleeve or tire 88 which is made of a plastic material such as urethane. The tire 88 of the pinch roller 34 has an outer circumference whose radius of curvature is concentric with the radius of curvature of the recess 68 as is shown best in FIG. 4. When the pinch roller 34 is properly positioned with regard to the drive roller 30, it passes through an opening 90 in side wall 24 and its outer diameter is advanced slightly into the recess 68 of the drive roller 30 as shown in FIG. 4. The pinch roller 34 is resiliently biased towards the drive roller 30 by the plate 78 which is mounted in cantilever fashion. A screw 92 provides an adjustable stop for the free end of plate 78 to abut thereagainst to adjustably position the pinch roller 34 with regard to drive roller 30.

When there is no sheet like 28A passing in the track 12 between the side plates 24 and 26 in FIG. 4, the pinch roller 34 does not rotate. This minimizes wear on the roller 34 and eliminates the need for bearings for mounting it. When a sheet like 28A passes between the drive roller 30 and the pinch roller 34, it is driven therebetween by partially deforming the sheet in the area of the recess 68 to move the sheet downstream as previously described. The rotating axes of shaft 62 of the drive roller 30 and axle 76 of the pinch roller 34 may be tilted for about 2 or 3 degrees in planes parallel to the side walls 24 and 26 as shown by dashed line 94 in FIG. 5 so as to gently drive a sheet like 28A to the bottom of track 12 as it is moved downstream (to the right as viewed in FIG. 5).

The drive roller 32 (FIG. 1A) and its associated drive pulley 96 and the associated pinch roller 36 are constructed in exactly the same manner as are drive pulley 30 and its associated pinch roller 34; therefore, an additional explanation of them is not deemed necessary.

Figure 7:
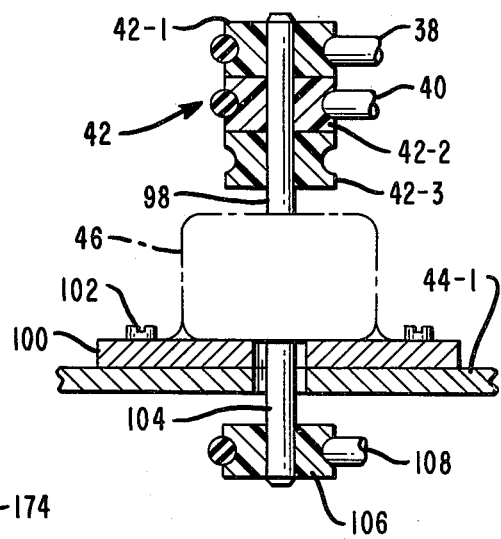
FIG. 7 is a cross-sectional view, taken along line 7—7 of FIG. 1A to show how several drive rollers like 30 and 32 are driven from a tandem drive pulley.

The tandem drive pulley 42 shown in FIG. 1A is shown in more detail in FIG. 7. The drive pulley 42 includes pulleys 42-1, 42-2, and 42-3 which are fixed to rotate with the output shaft 98 of motor 46. Motor 46 has a mounting flange 100 which enables it to be secured to the plate 44-1 of frame 44 by fasteners 102. The motor 46 also has a shaft 104 extending through the mounting plate 44-1 to enable a drive pulley 106 to be driven thereby. The drive pulleys 42-1, 42-2, 42-3, and 106 are all similar in construction to the pulley 48 already described in relation to FIG. 4. Pulley 42-1 receives endless belt 38 to rotate drive roller 30, pulley 42-2 receives endless belt 40 to rotate drive roller 32, and pulley 42-3 is similarly used to rotate additional drive rollers (not shown). The drive pulley 106 located beneath the mounting plate 44-1 (as viewed in FIG. 7) receives an endless belt 108 to rotate the drive roller 110 which is located at the staging area 22 alluded to earlier herein. Because the drive roller 110 is located on a side of track 12 which is opposite from drive rollers 30 and 32, the associated endless belt 108 is "crossed over" so as to enable the drive roller 110 to rotate in a direction which moves a sheet like 28A in a downstream direction as previously described.

Sensors are provided along the track 12 (FIG. 1A) to detect the presence of sheets like 28A at various positions along the length of the track 12. A first light source 112 and associated conventional sensor 114 detect the presence of the sheets at a point which is close to the hopper 14. The output of the sensor 114 is part of a means for controlling the apparatus 20 and is designated generally as 116 and shown in block form in FIG. 2. The control means 116 includes a length detect circuit 118 which determines the length of a sheet passing by the sensor 114. The length detect circuit is conventional and includes, for example, oscillator and counter circuits for determining the length of a sheet while it passes by the sensor 114. The output of the circuit 118 is then stored in a random access memory (RAM) 120 associated with the control means 116 to be used as will be described hereinafter.

The control means 116 may be conventional and includes, additionally, a read only memory (ROM) 122, a microprocessor (MP) 124, a keyboard (KB) 126 for providing an input of data to the apparatus 10, a display device such as a cathode ray tube (CRT) 128 for communicating with a user of the apparatus 10, and control logic 130. The necessary software for performing the processing of data associated with the apparatus 10 is stored in the ROM 122, and sequencing of operations is performed conventionally by the ROM 122, RAM 120, and the MP 124. The control logic 130 is conventional and includes logic circuitry and interfaces necessary to effect control.

A second sensor is located along the track 12 (FIG. 1A) and includes a light source 132 and a conventional associated gate sensor 134 which are used to detect the leading edge of a sheet like 28A as it approaches the staging area 22. The output of the gate sensor 134 is received by a conventional sense circuit 136 (FIG. 2) which, for example, amplifies the signal from the sensor 134 and routes it to the control logic 130. The signal from the sensor 134 is used by the control means 116 to decide when to fire or energize a gate solenoid 138 located at the staging area 22; this aspect will be described hereinafter.

For the moment, assume that a first sheet like 28A is approaching the gate sensor 134, and the gate solenoid 138 has not been as yet energized via its driver 139 and the control means 116. In this situation, a moveable member or toggle designated generally as 140 will be in a first position with regard to a stationary member or pad 142. One end 144 of the toggle 140 is positioned to contact the pad 142, and the other end of the toggle 140 has a pinch roller 146 rotatably mounted thereon which is positioned to cooperate with the drive roller 110 to move a sheet along the track 12. The toggle 140 is pivoted between its ends on a stationary pivot pin 148.

When the toggle 140 is in the first position mentioned and shown in FIG. 1A, a spring 150 pulls the first end 144 of the toggle 140 away from the pad 142 and moves the pinch roller 146 into engagement with the drive roller 110 to form a driving connection therebetween to advance a sheet like 28A or 28B along the track 12. When the leading edge of a sheet like 28B is detected by sensor 134, the control means 116 will decide when to energize the solenoid 138 so as to stop the sheet at the staging area 22 at a predetermined position along the track 12. When the solenoid 138 is energized, it moves the toggle 140 to a second position in which the pinch roller 146 is operatively uncoupled from the drive roller 110 and the first end 144 is moved towards the stationary member 142 to "pinch" a sheet like 28A or 28B between the pad 142 and the first end 144, thereby bringing the sheet to a halt at the staging area 22. The surface of the pad 142 preferably has a high coefficient of friction to cooperate with the end 144 in stopping the sheet 28A or 28B. The sheet like 28B shown, will remain at the staging area 22 until the control means 116 de-energizes the solenoid 138. When solenoid 138 is de-energized, the spring 150 will move the toggle 140 to the first position in which the end 144 is uncoupled from the pad 142 and the pinch roller 146 is operatively coupled with the drive roller 110 to cause the sheet to be moved along track 12 to the encoder 20 in the embodiment described.

Figure 8:
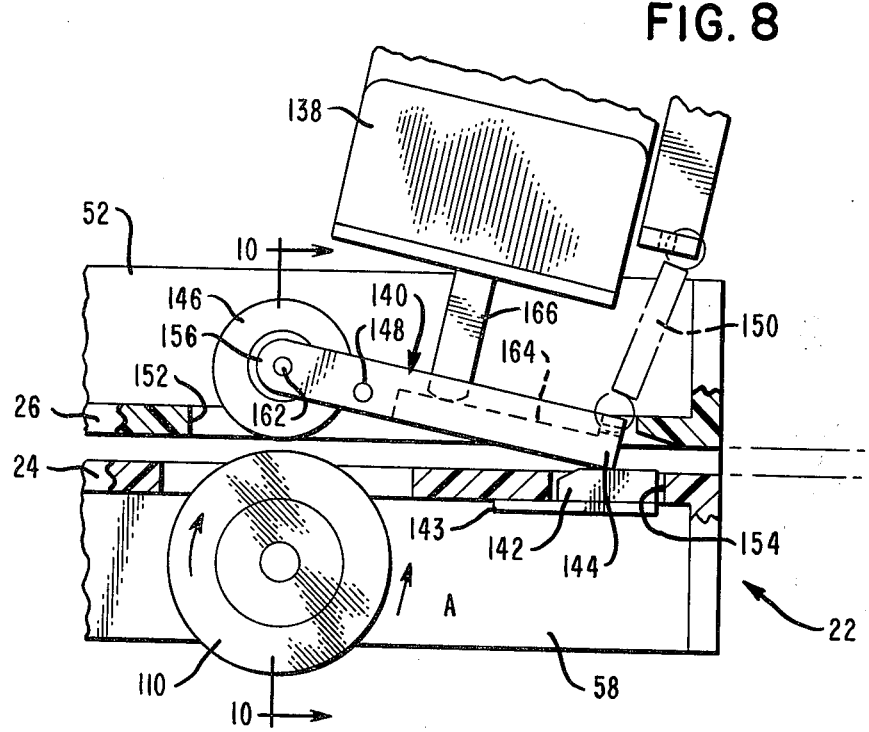
FIG. 8 is an enlarged plan view of a staging area shown in FIG. 1A.

The staging area 22 shown in FIG. 1A is shown in more detail in FIG. 8 which is enlarged somewhat compared to FIG. 1A. A portion of the tops of the side members 24 and 26 have been removed in FIG. 8 to facilitate a showing of certain elements therein. The side wall 26 of the track 12 has an opening 152 therein to enable the end 144 of the toggle 140 and the pinch wheel 146 to pass therethrough as previously explained. The side wall 24 also has an opening 154 therein to enable the end 144 to move a sheet against the pad 142 as previously described. The pad 142 is made of a plastic material like urethane. The width of pad 142 shown in FIG. 8 is about ½ inch and its vertical height as measured along the height of the track 12 is about one inch in the embodiment described. The pad 142 is secured to a plate 143 which is secured to the side wall 24.

Figure 10:
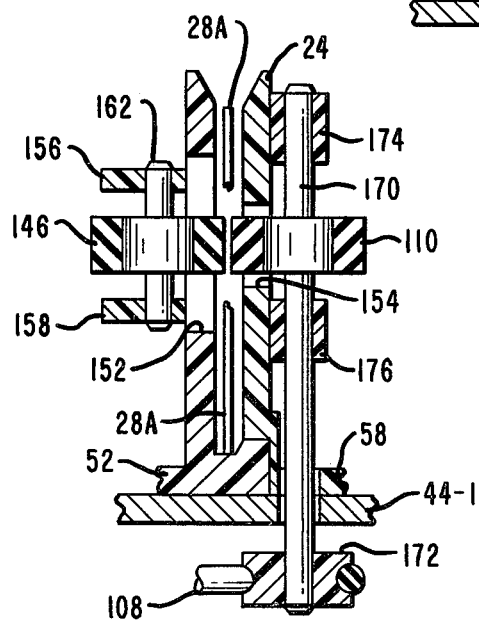
FIG. 10 is a cross-sectional view taken along the line 10—10 of FIG. 8 to show additional details of the staging area.
Figure 9:
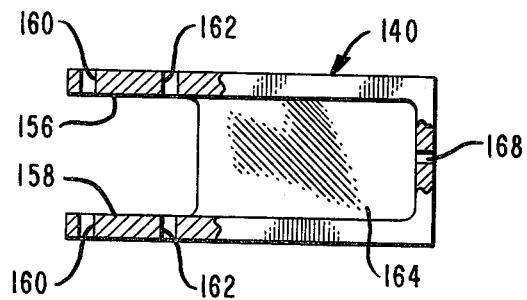
FIG. 9 is an enlarged view of the toggle as viewed from the direction A shown in FIG. 8.

The toggle 140 shown in FIG. 8 is shown in more detail in FIG. 9. The toggle has spaced upper and lower arms 156 and 158 with holes 160 wherein to rotatably receive the axle 162 as shown in FIG. 10. The arms 156 and 158 also have holes 162 (FIG. 9) to receive the pivot pin 148 (FIG. 8) as previously described. The arms 156 and 158 are joined by planar area 164 to which the plunger 166 (FIG. 8) of solenoid 138 is secured. A hole 168 in the toggle 140 is provided to secure the spring 150 (FIG. 8) thereto.

FIG. 10 shows additional details of the drive wheel 110 and the pinch roller 146. The drive wheel 110 is supported on a shaft 170 which extends through mounting plate 44-1 and has a drive pulley 172 secured thereto to drivingly receive the endless belt 108 coming from the drive pulley 106 shown in FIG. 7. The shaft 170 is suitably mounted in bearings 174 and 176 which are secured to the side wall 24. The drive roller 110 has the same outer diameter and is rotated at the same angular velocity as drive rollers 30 and 32 so as to move a sheet like 28A at the same linear velocity along track 12. The drive roller and its associated pinch roller 146 provide what is termed a "hard drive"; these rollers have straight cylindrical sides as shown in FIG. 10, and are made of urethane.

Figure 2:
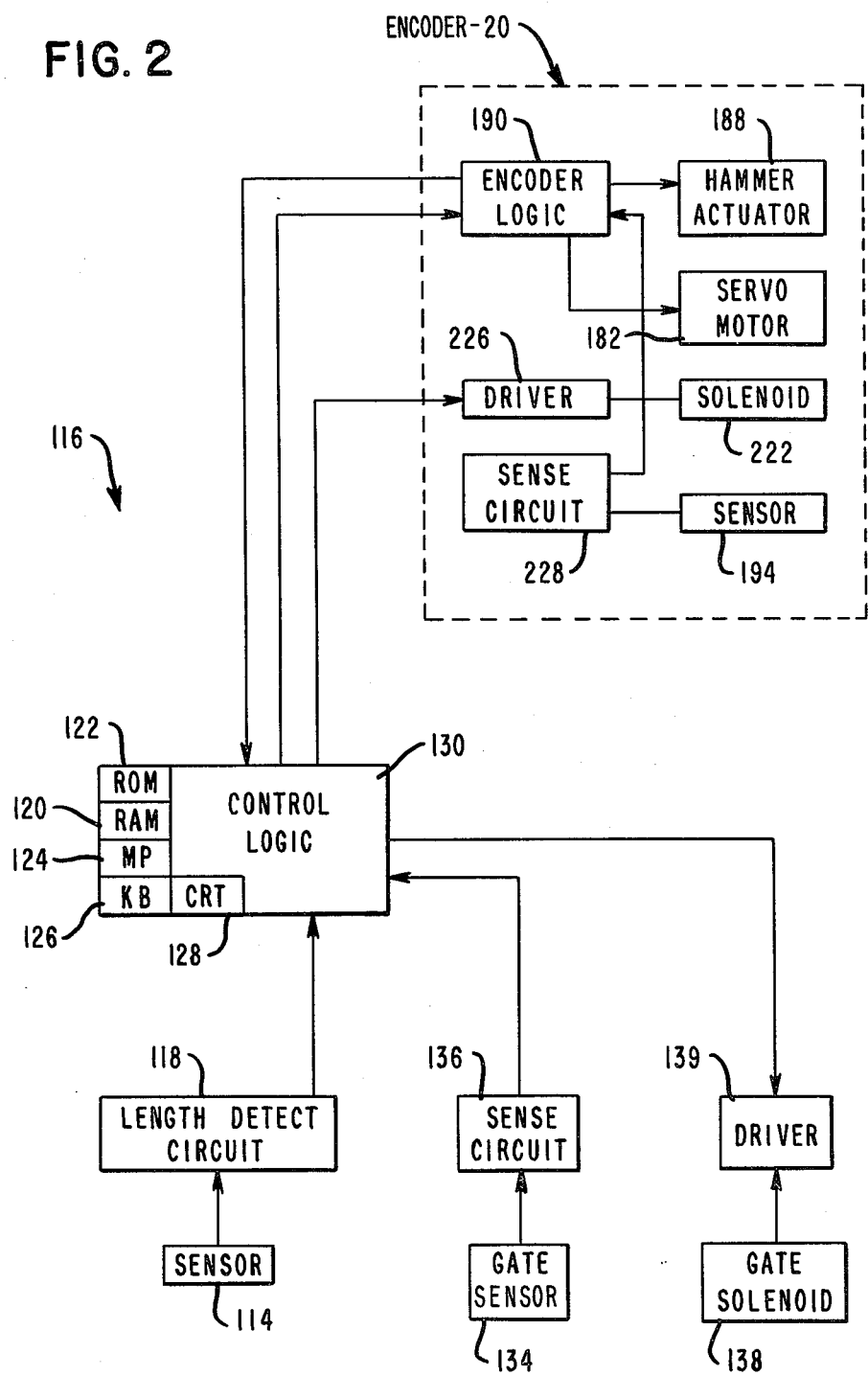
FIG. 2 is a schematic diagram in block form showing a means for controlling the apparatus shown in FIG. 1.

The encoder 20, (FIG. 1B) alluded to earlier, is located downstream from the staging area 22 just described. The encoder 20 includes a print or typewheel 178 which is rotatably mounted on a shaft 180 which is rotated by a bi-directional servo motor 182. A print hammer 184 is pivotally mounted on a vertical pin 186 to enable the print hammer 184 to impact against the sheet like 28A. A ribbon (not shown) is suitably placed between the typewheel 178 and sheet 28A to effect the printing. The hammer 184 is actuated each time the associated actuator 188 is energized. The servo motor 182 and the actuator 188 are under the control of conventional encoder logic 190 (FIG. 2). The encoder logic 190 does the necessary formatting of data to be printed and issues signals to the motor 182 to rotate it so as to present a selected number, for example, thereon in printing relationship with the hammer 184.

A light source 192 (FIG. 1B) located on one side of the track 12 cooperates with a conventional associated sensor 194 located on the opposite side of the track to detect the leading edge of a sheet like 28A as it is moved into printing relationship with the encoder 20.

The encoder 20 (FIG. 1B) includes a toggle 196 which is pivotally mounted on a pivot pin 198 to enable toggle 196 to pivot between first and second positions. The encoder 20 also includes a drive roller 200 which is rotated by a drive pulley 202. Drive pulley 202 is operatively coupled to a tandem drive pulley 204 by an endless belt 206. Tandem drive pulley 204 may be rotated by a motor 208 or it may be driven by a suitable drive coupling (not shown) from motor 46 shown in FIG. 1A. Drive roller 200 is similar to drive roller 110 already described and it is considered the high speed drive to drive a sheet like 28 in the track at the same speed as drive rollers 110 and 30, for example, already described. Drive roller 212 is considered the slow speed drive roller and it is rotated by a drive pulley 214 which is coupled to the tandem drive pulley 204 by an endless belt 216. The diameter of the slow drive roller 212 is less than that of drive roller 200 and its diameter is chosen so as to produce the appropriate linear printing speed for moving a document like 28A in the encoder 20. The coefficient of friction of drive rollers 110 and 200 of the first drive means is less than the coefficient of friction of drive roller 212 to enable the drive roller 212 to control the movement of the sheet like 28A during printing.

A pinch roller 218 is rotatably mounted on one end of the toggle 196 and a pinch roller 220 is rotatably mounted on the other end of toggle 196. When the solenoid 222 is energized, the toggle 196 is pivoted (in a clockwise direction as viewed in FIG. 1B) about pivot pin 198 to move the pinch roller 220 into a first position; i.e. into operative relationship with the slow speed drive roller 212 during printing or encoding. The solenoid 222 moves the toggle 196 into the first position against the bias of spring 224 to effect the printing. When the printing is completed, the encoder logic 190 (FIG. 2) will issue a signal to the control logic 130 which will then de-energize the solenoid 222 through its associated driver 226.

When the solenoid 222 (FIG. 1B) is de-energized, the spring 224 will pivot the toggle 196 from the position shown to a second position in which pinch roller 220 is uncoupled from drive roller 212 and pinch roller 218 is coupled to high speed drive roller 200 to move the sheet 28A out of the encoder 20 to an output pocket (not shown) or to other stations such as an endorser, for example, which are not important to an understanding of this invention, and consequently, are not shown.

The output of sensor 192 (FIG. 1B) is amplified for example, in a conventional sense circuit 228 (FIG. 2) whose output is fed to the encoder logic 190 to initiate the printing or encoding by encoder 20.

After the encoding is completed at the encoder 20, the sheet just encoded like sheet 28A is moved out of the encoder 20 by the high speed drive roller 200 when the solenoid 222 (FIG. 1B) is deenergized. The encoder logic 190 (FIG. 2), as a result of formatting the data to be printed, knows when the encoding is completed. An end of printing signal (not shown) from the encoder logic 190 is routed to the control logic 130 enabling it to also deenergize gate solenoid 138 associated with the staging area 22 (FIG. 1B). This means that as the sheet 28A at the encoder 20 is moved downstream out of the encoder, the next sheet 28B at the staging area 22 is moved into the encoder 20 at the same linear velocity. In the embodiment described, this linear velocity is 120 inches per second, with a throughput of documents or sheets equal to about 130 documents or sheets per minute.

The encoding done at the encoder 20 (FIG. 1B) in the embodiment described, consists of printing about 12 numbers on one side of the sheets like 28A and 28B. Naturally, the amount of printing and related throughput rates can be changed to suit particular applications. When the trailing edge of the sheet 28A (being driven by drive roller 200) passes the sensor 194, it changes state enabling the encoder logic 190 to energize the solenoid 222 (after a short pause) via the control logic 130. This enables the drive roller 212 and the pinch roller 220 to be ready to receive the next sheet like 28B to be fed. The leading edge of the sheet 28B is detected by the sensor 194 just before it is captured by the drive roller 212 and the pinch roller 220, thereby signalling the encoder logic 190 to begin encoding after a short pause. The hammer 184 and the typewheel 178 are actually located just slightly upstream of the drive roller 212 so as to be close to the first or leading printing position on the sheet like 28B so as to minimize the time that the sheets have to travel at the slower, encoding rate compared to the normal rate of 120 inches per second in the example described. When the next succeeding sheet 28B arrives at the encoder 20, its leading edge will be detected by the sensor 194 to initiate the encoding as previously explained.

Earlier herein it was stated that the length of each sheet passing sensor 114 (FIG. 1A) is determined and stored in the RAM 120 (FIG. 2) as previously explained. Assume that the length of sheet 28A (FIG. 1B) is known and the leading edge of the next succeeding sheet like 28B is approaching the gate sensor 134. In the embodiment described, a sheet like 28B will travel approximately ½ inch (with a tolerance of about 1/10 inch) from the time the gate solenoid 138 is energized until the sheet is stopped at the staging area 22. The control means 116 uses the length of the prior sheet like 28A, the stopping distance of ½ inch, and the length between the encoder 20 and the staging area 22 to decide, conventionally, when to fire the gate solenoid 138 so as to leave about one inch of space between the trailing edge of the prior sheet 28A and the leading edge of the succeeding sheet 28B. By minimizing the space between trailing and leading edges of sheets as just explained, the throughput of documents or sheets is increased from the 130 mentioned to approximately 150 per minute.

The length detect circuit 118 shown in FIG. 2 may be replaced with a plurality of length sensors like 230, 232, and 234 (FIG. 1B) and their associated sources of light (not shown) positioned along the track 12 to provide the control means 116 with the location of the trailing edge of a sheet like 28A located at the encoder 20. The particular one of these sensors like 230 and 232, for example, which "detects" the trailing edge is used by the control means to determine, conventionally, when to energize the solenoid 138 as previously described.

I claim:

1. A sheet feeding apparatus comprising:
   means for guiding a sheet therein; said guiding means having an upstream end and a downstream end, with a staging area located therebetween;
   means for moving a said sheet from said upstream end towards said downstream end;
   control means including a stationary member and a moveable member located at said staging area; said moveable member being moveable between first and second positions with regard to said stationary member and said moving means; said moveable member when in said first position being operatively uncoupled from said moving means and being operatively coupled to said stationary member to stop a said sheet therebetween at said staging area, and said moveable member when in said second position being operatively uncoupled from said stationary member and being operatively coupled to said moving means to move said sheet from said staging area towards said downstream end;
   said control means also including means for moving said moveable member between said first and second position;
   a utilization device located downstream from said staging area to receive a said sheet from said staging area; and
   said control means also including means for determining the length of a said sheet which becomes positioned at said utilization device; said control means also responding to said determining means so as to enable said moving means to stop a subsequent sheet at said staging area so that the leading edge of said subsequent sheet is positioned at a predetermined distance from the trailing edge of said sheet at said utilization device.

2. The apparatus as claimed in claim 1 in which said utilization device comprises:
   means for detecting the leading edge of a said sheet thereat to produce a presence signal; and
   means for printing on a said sheet;
   said printing means including second means for moving a said sheet in printing relationship with said printing means and also including a drive roller;
   said presence signal being used by said control means to energize said second moving means for moving a said sheet in said printing relationship;
   said first named moving means including drive rollers having a coefficient of friction which is less than the coefficient of friction of said drive roller of said second moving means to enable said second moving means to control the movement of a said sheet at said printing means for said printing relationship.

3. The apparatus as claimed in claim 2 in which said second moving means also includes:
   a pinch roller located on one side of said guiding means;
   a toggle member having thereon said pinch roller of said second moving means; and
   means for moving said pinch roller on said toggle member between operative and inoperative positions with respect to said drive roller of said second moving means.

4. The apparatus as claimed in claim 1 in which determining means includes a plurality of detectors placed along said guiding means to detect the location of the trailing edge of said sheet which becomes positioned at said utilization device.

* * * * *